INVENTORS
Walter L. Bloom
Robert E. Meek

Nov. 29, 1966   W. L. BLOOM ETAL   3,289,016
COUPLING CONTROL DEVICE

Filed July 22, 1963   2 Sheets-Sheet 2

INVENTORS
Walter L. Bloom
Robert E. Meek
BY
ATTORNEY

United States Patent Office 3,289,016
Patented Nov. 29, 1966

3,289,016
COUPLING CONTROL DEVICE
Walter L. Bloom, Bloomland Farm, Rte. 3, Marietta, Ga., and Robert E. Meek, 1009 Adair Ave. NE., Atlanta, Ga.
Filed July 22, 1963, Ser. No. 296,672
5 Claims. (Cl. 307—116)

This invention relates to a coupling control apparatus, and is more particularly concerned with a coupling device to allow one piece of equipment to control the operation of a second and separate piece of equipment.

It is frequently desirable to coordinate the operation of one apparatus with another. One example of this is in the audio-visual field. It is common practice in various presentations to use a slide projector for showing illustrations to supplement the narration. If the narrator is giving his presentation in person, he normally manipulates the projector; however, if the narration is pre-taped or recorded, there must usually be someone present that is familiar with the narration to manipulate the slide projector at the proper times, which requires that a person become familiar with the program before the presentation so that he recognizes all of the cues on which to make proper slide changes.

Previous controls for operating a projector have included remote control units such that a switch can be closed to change the picture. This is satisfactory for a live presentation, but is lacking for a pre-recorded performance. Even in a "live performance," the narrator must have the switch close at hand, and must be able to manipulate same without distracting the audience.

The coupling control device of the present invention overcomes the above stated difficulties by providing a control device which is sensitive to a selected period of relative silence during the narration. The selected period of relative silence activates the device to close a switch and operate the picture changing mechanism in the projector.

The "relative silence" term is important because of the many background noises that one may encounter during a programming session. If someone in the audience talks during a silent period, the sound may ordinarily be sufficient to prevent the projector from changing; however, with the use of a selected relative silence, the device will still operate as intended to change the picture.

The term *relative silence* will be better understood from the following discussion:

A person's speech is of a binary character. Either a person is making a sound, or he is not. During a speech, there will be many pauses of various durations; also, there will be many fluctuations in the intensity of the sound.

When pauses in speech are studied it is found that there exists a certain residual level of sound energy often referred to as background noise. This noise comes from various sources such as inhaling or exhaling one's breath, and external mechanical and natural noises. If the speech is heard through an amplifier-speaker system, then certain electric circuit noises also contribute to the background noise. The pause interval level, therefore, is only relatively silent with respect to the level of the spoken thought interval. This sound level which acts as a period of actual silence is called a "relative silence." Of course, the term "relative silence" can include actual silence.

Another significant term is the *selected pause time* associated with the period of relative silence. Since there are pauses between spoken thoughts distinction must be made between these normal pauses and that pause at which it is desired to produce a control signal. Therefore, a selected pause time of relative silence must be a period whose minimum length is longer than the period of normal pauses.

The device of the present invention is designed so that it can be adjusted to have the desired selective response to the foregoing parameters of the input signal. Its sensitivity is such that it may be controlled to operate properly in the presence of small signal-to-noise ratios and its time adjustment range is sufficiently wide to suit the speaking characteristics of any narrator.

The impetus that gave rise to the conception of this invention was the need for a device that would couple together a brand of tape recorder or a brand of phonograph with another brand of slide projector to facilitate automatic operation in a teaching program.

The existence of different brands of equipment within the audio-visual aid inventory of many organizations is quite common, but the lack of means offered on the current market to obtain automatic operation of the combination of these units indicates there is a need for a sort of universal coupling device that will fill in this gap with little difficulty or expense.

The present device requires little or no modification of the equipment to which it is connected, is simple to operate, and is reasonably low cost.

In consideration of other applications where automatic control can be greatly facilitated by sound information this device offers possibilities. Many of these cases fall into the category of alarm systems such as monitoring machine operation in manufacturing processes, detecting the absence of the audio along the signal path in broadcast station equipment, and monitoring the heart beat of a patient with cardiac problems.

These and other features and advantages of the present invention will become apparent from consideration of the following specification when taken in conjunction with the accompanying drawings in which.

Figure 1:
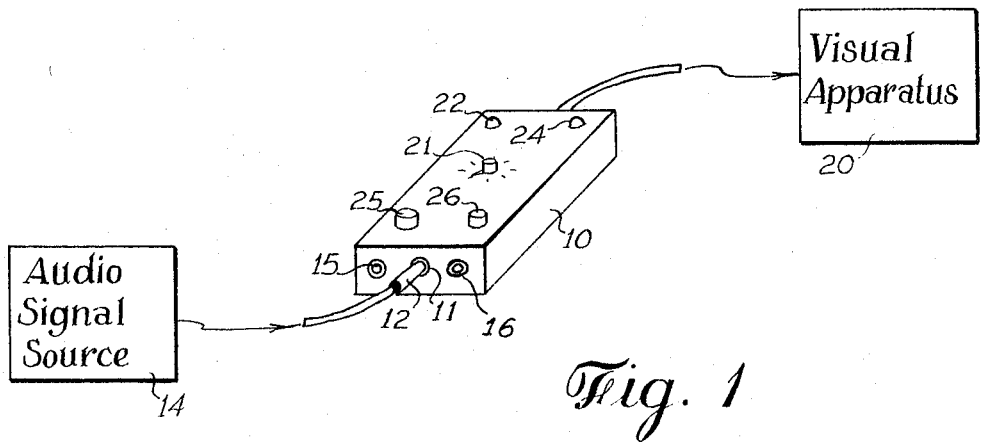
FIG. 1 is a perspective view of the coupling device with a schematic representation of the audio and visual apparatus.

Referring now more particularly to the drawings, and to that embodiment of the invention here chosen by way of illustration, the device shown in FIG. 1 includes a box 10 having, on one end, a jack 11 to receive the standard plug 12 from the audio signal source 14. Beside the jack 11 is a second jack 15 to receive the plug on an external speaker (not shown).

The opposite end of the box 10 has connecting means for the control circuit of the visual apparatus 20. The connecting means may include any plug or the like, though it is preferable that the connecting means be of a style to receive a standard plug so that any existing type of apparatus can be connected with ease.

The top panel of the box 10 has a dial 21 substantially centrally located. One end of the top panel has two indicator lamps 22 and 24; and, the opposite end of the top panel has a dial 25 and a push-button 26. The actual connections and functions of these dials will be understood from the description which follows.

Figure 2:
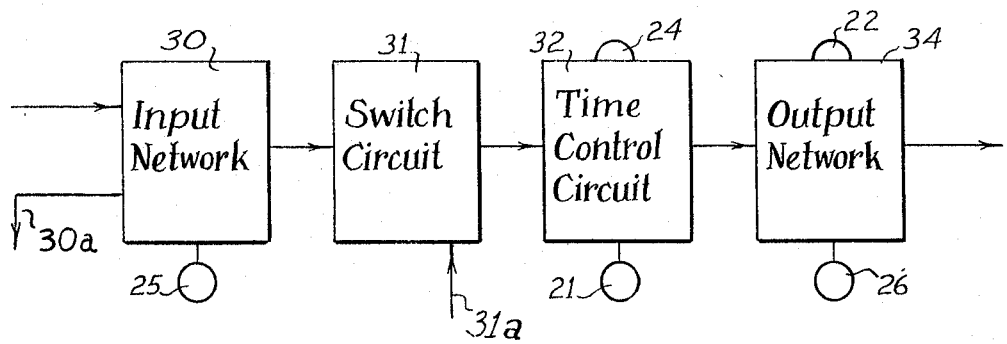
FIG. 2 is a block diagram of the coupling device.

Attention is now directed to FIG. 2 for a general understanding of the device.

The coupling device includes an input network 30 having a sensitivity control which is adjusted by the dial knob 25 on the top panel of the box 10. The sensitivity control varies the sensitivity of response of the coupling device to the sound level of the input signal.

The input network also provides a through path for the signal from the audio signal source to an external speaker on lead 30a. This feature provides convenience of connection of the coupling device into a system in some cases.

A signal from the input network 30 is fed into a switch circuit 31 containing a solid state switch element, which determines the operating condition of the time control circuit 32. The presence of a signal in the switch circuit "latches" the time control circuit into a condition that prepares it to operate when a pause interval of sufficient minimum length appears. A disabling function may be applied on lead 31a and override the action of the switch circuit to hold the time control circuit in latch condition independent of the input signal. A feature of this disabling circuit is that it may be considered a means for producing manual operation of the coupling device in the absence of an input signal. Also the disabling circuit connection provides for an output of the switch circuit action to operate or control other time control circuits of similar design. This provides multiplex operation of several coupling devices from one input signal source.

The time control circuit 32 contains electrical and mechanical elements that determine the period between the initial part of a pause interval and the production of an output control signal. Dial 21 associated with this circuit is the means by which adjustment of the desired pause time is accomplished. Indicator light 24 is a part of this circuit that shows when the input signal is of sufficient level to "latch" the time control circuit.

A signal from the time control circuit 32 is fed into an output network 34 which actually produces the control output. The output network has an indicator lamp 22 to show that an output signal has been produced in the device, and the control circuit has been actuated.

A push button 26 associated with the output network is used in conjunction with indicator light 24 to determine the "latch" condition of the coupling device. In addition, the relative condition of the self contained battery supply may also be noted by observing the degree of lamp brightness of 22.

Figure 3:
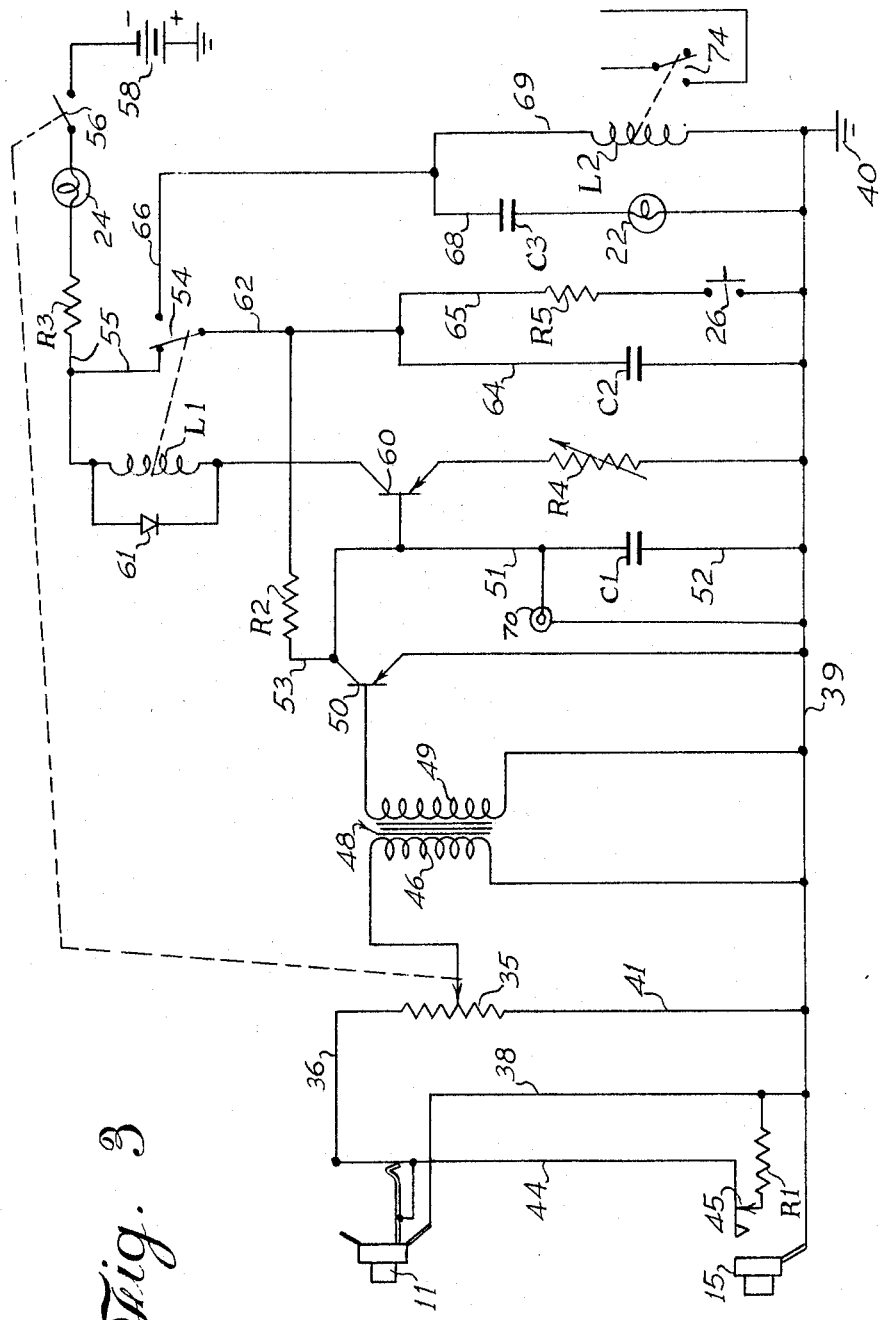
FIG. 3 is a complete schematic circuit diagram of the coupling device.

Referring now to FIG. 3 of the drawings, it will be seen that the jack 11 for the audio input signal has one terminal connected to one side of a potentiometer 35 by wire 36; and, the other terminal is connected through wire 38 to the bus 39 which is grounded at 40. The opposite side of the potentiometer 35 is also connected to the grounded bus 39, by wire 41.

The jack 15 for the external speaker (not shown) is connected in parallel with the jack 11 so that the signal from the audio device will be passed directly to the speaker. One terminal of the jack 15 is connected by a wire 44 to the wire 36, and the other terminal of the jack 15 is connected to the bus 39.

It will be seen from the drawings that the jack 15 is of the variety having a switch which is closed when the plug is removed, and opened when the plug is inserted. This kind of jack is well known in the art so no detailed mechanical description is deemed necessary. One terminal of the switch 45 is connected through a resistor R1 to the wire 44; and the other terminal of the switch 45 is connected to the bus 39. It will thus be seen that, when the switch 45 is closed, the resistance R1 is in parallel across the wires 44 and 39. This provides a dummy load in case the audio amplifier is used without the speaker, and prevents excess voltages in the output transformer of the audio amplifier. When the speaker is plugged into the jack 15, the switch 45 will be opened to isolate the resistor R1.

The arm of the potentiometer 35 is connected to the primary winding 46 of a transformer 48. The opposite side of the primary winding 46 is connected to the grounded bus 39. With this arrangement, a portion of the input signal will be directed through the primary winding 46 of the transformer 48, and the portion is adjustable by means of the potentiometer 35.

The secondary winding 49 of the transformer 48 has one side connected to the base of a transistor 50, while the other side is grounded by connection to the bus 39. The transistor 50 is a type, which allows a current to flow when the base is negative if there is a difference of potential between the emitter and the collector. Thus, the transistor 50 acts as a switch that is closed when there is a negative potential from the secondary winding 49 of the transformer 48.

A capacitor C1 is connected in parallel with the transistor 50 by a wire 51, and is grounded by a wire 52 connected to the bus 39. Between the capacitor C1 and the collector of the transistor 50, a wire 53 is attached, leading to a resistor R2; and, the resistor R2 is connected to the armature of a relay contact 54. The normal point of the relay contact 54 is connected to a wire 55 which leads through a resistor R3, indicator light 24, switch 56 and to the battery 58.

It will be seen that, with the relay contact 54 in the normal position, a current will flow from the battery 58, through lamp 24, resistor R3, contact 54, thence through resistor R2 to capacitor C1 and to grounded bus 39 to ground 40. This will charge the capacitor C1; however, as long as there is a negative potential on the base of the transistor 50, there will be a very low resistance circuit from the capacitor C1, through bus 39, to the emitter of transistor 50, from the collector of transistor 50 through wire 51 back to the capacitor C1, which will drain off any charge that would tend to accumulate on the capacitor C1.

A transistor 60 has its base connected to the wire 51. The emitter is connected through a variable resistor R4 to the grounded bus 39; and the collector is connected through relay coil L1 to the wire 55. A diode 61 is connected in parallel with the relay coil L1 to prevent the back E.M.F. of coil L1 from passing through transistor 60 to damage it.

The transistor 60 is also of the type that allows a current to flow in the emitter-collector circuit when the base has a negative potential; therefore, a negative potential on the base of the transistor 60 will allow a current to flow from wire 55, through the relay coil L1, through transistor 60 to wire 39 and ground 40. This will energize the relay coil L1 to transfer the relay contact 54.

The armature of relay contact 54 is connected to a wire 62 which is in turn connected to a parallel circuit having two branches. One branch has a wire 64 containing a capacitor C2, and connected to bus 39. The other branch has a wire 65 containing a resistor R5 in series with the push-button 26, and connected to the bus 39.

When the input signal reappears at jack 11 following a pause interval of sufficient length the time control circuit 32 is put in latched condition. This results in having the current through relay coil L1 drop towards zero and restores the armature contact 54 to its normal position. Upon the initial make of this normal contact position, an inrush of charge will flow from battery 58 through indicator lamp 24, through resistor R3, through the normal contact position 54, through wires 62 and 64, and into capacitor C2. This initial inrush of current is of sufficient value to produce momentary incandescence of the filament of lamp 24. This momentary flash of light provides visual indication that the time control circuit 31 is in latched condition.

The transfer point of relay contact 54 is connected to a wire 66 which is connected to another parallel circuit having two branches. A wire 68 is connected between the wire 66 and the bus 39, and includes a capacitor C3 in series with the indicator light 22. The other branch has a wire 69 having a relay coil L2 therein.

It will thus be seen that, when the relay contact 54 is in its normal position, current can flow from the wire 55, through contact 54, to wire 62, to wire 64 to charge the capacitor C2. When the relay contact 54 is transferred, current will flow from the capacitor C2, through wires 64 and 62, through the contact 54, to wire 66, and to the parallel circuit to pass a current through the capacitor C3 and light 22; and, current will flow through the relay coil L2 to energize the coil and transfer the relay contact 74.

In operation, a signal is fed into the wires 36 and 38 from the audio amplifier, through the jack 11. The arm of the potentiometer 35 is set to send a portion of the signal into the transformer 48. The potentiometer is the sensitivity setting for the device which determines its response to the intervals in sound level that will constitute a relative silence.

The switching means for the device is the transistor 50; and, since the switch will be "off" when the base is at a low negative potential and "on" at a high negative potential, the switch (transistor 50) will be controlled by the output of the transformer 48. The signal from the transformer 48 is dependent on the input signal to the primary winding 46, and the input signal is varied by potentiometer 35. It will thus be seen that the potentiometer 35 will vary the strength of audio signal at the transformer required to activate the transistor 50.

The switch 56 is closed as soon as the arm of the potentiometer 35 is moved. This is a standard arrangement well known in the art. When the arm of the potentiometer 35 is set, the switch 56 is closed; hence, there is a potential through wire 55, through the relay contact 54, through resistor R2, wire 51 to the capacitor C1. If there is an audio signal to the transformer 48, the base of the transistor 50 will have a high negative potential which will allow current to flow through the resistor R2, through transistor 50, and to ground bus 39. Since a current can flow through the transistor 50, any charge on the capacitor C1 will be discharged through the transistor 50.

Now, if there be a silent period, there will be no signal to the primary winding 46 of the transformer 48; hence, there will be no potential on the base of the transistor 50. This state prevents current from flowing in the emitter-collector circuit; therefore, current will flow from wire 55, through relay contact 54, through resistor R2 to charge the capacitor C1. Since current cannot flow through the transistor 50, the charge will remain on the capacitor C1.

As the charge builds up on the capacitor C1, the potential will be applied to the base of the transistor 60. It will be observed that the transistor 60 is connected to the negative side of the capacitor C1; therefore, as the charge builds up, the transistor 60 will have a negative potential at its base, which will allow a current to flow in the emitter-collector circuit.

Current will now flow from wire 55, through relay coil L1, through the transistor 60, through variable resistor R4 and to ground bus 39. With a current flowing through the resistor R4, there will be a voltage drop across the resistor, giving a lower potential at the emitter of the transistor 60. Since the rate of current build-up through the transistor 60 is dependent on the difference of potential between the base and the emitter, the value of the resistor R4, resistor R2, capacitor C1 and the current gain of transistor 60 will determine the length of time that the proper current will flow through the relay coil L1. The potential on the capacitor C1 will be fixed, once the capacitor is selected; therefore, the resistor R4 is variable to vary the time the relay coil L1 will be energized.

When the relay contact 54 is transferred, the capacitor C2, which is charging during the normal times, will discharge through the wire 66 to energize the relay coil L2, and send a brief pulse through the capacitor C3 and lamp 22. The lamp 22 will receive current only during the charging of the capacitor C3 since no current can flow after the capacitor C3 is fully charged.

As long as sufficient current is passing through the relay coil L2, the contact 74 will be transferred, which operates the control circuit in the projector or other apparatus to be controlled. The charge on the capacitor C2 will hold the relay L2 for a short time.

During the initial adjustment of the device, while there is an audio signal on the wires 36 and 38, the push-button 26 may be depressed. This will discharge the capacitor C2; and, if the relay contact 54 is in its normal position, current will flow from the battery 58 through the lamp 24, through resistor R3, contact 54, resistor R5, and switch 26 to bus 39. The glow of light from the lamp 24 will indicate that the device is in proper position, and the sensitivity is properly adjusted. If there is no glow of light, the relay contact 54 is in its transferred position, and the device is not operating on the strength of audio signal used, calling for readjustment of the potentiometer 35.

Each time a controlling pulse is sent through the relay L2, a pulse is also sent through the lamp 22; hence, there will be a visual indication each time the control circuit is energized.

It will thus be seen that the device of the present invention provides a simple, inexpensive means to operate a piece of apparatus by periods of relative silence in signal. The capacitors and resistors offer convenient means for adapting the device to many different situations, since the rate of charge of the capacitors is determined by resistors; and, the transfer time of the relays is determined by the combination of the particular capacitors and resistors.

It will, of course, be understood that the particular embodiment of the invention here presented is by way of illustration only, and is meant to be in no way restrictive; therefore, numerous changes and modifications may be made, and the full use of equivalents resorted to without departing from the spirit or scope of the invention as outlined in the appended claims.

We claim:

1. A coupling control device for operating switch means in response to low intensity portions of a signal comprising sensing means for sensing said low intensity portions of said signal, timing means for determining when said low intensity portion of said signal is of a minimum selected duration, said timing means including a capacitor, a first resistor in series with said capacitor, voltage producing means for charging said capacitor, electronic switch means controlled by the charge on said capacitor, a second resistor connected in series with said electronic switch means, a relay coil in series with said electronic switch means and said voltage producing means, said first resistor and said capacitor being connected in parallel with said second resistor, said electronic switch means, and said relay coil, across said voltage producing means, and circuit means to operate said switch means when said low intensity portion is of said selected minimum duration.

2. A coupling control device for operating switch means in response to low intensity portions of a signal comprising sensing means for sensing said low intensity portions of said signal, timing means for determining when said low intensity portions of said signal is of a minimum duration, and circuit means to operate said switch means when said low intensity portion of said signal is of said selected minimum duration, said circuit means including a relay coil to operate said switch means; a capacitor, and means positioned between said capacitor and said relay coil for directing a charge on said capacitor through said relay coil free of any intervening circuitry so that said charge will be dissipated in said relay coil.

3. A coupling control device for operating switch means in response to low intensity portions of a signal comprising sensing means for sensing said low intensity portions of said signal, said sensing means including electronic switch means operable by electrical potential, timing means for determining when said low intensity portion is of a minimum duration, said timing means including a capacitor, a first resistor in series with said capacitor, voltage producing means for charging said capacitor, electronic switch means controlled by the charge of said capacitor, a second resistor connected in series with said electronic switch means, a relay coil in series with said electronic switch means and said voltage producing means, said first resistor and said capacitor being connected in parallel with said second resistor, said electronic switch means, and said relay coil, across said voltage producing means, and circuit means to operate said switch means when said low intensity portion is of said minimum duration, said circuit means including a relay coil to operate said switch means, a capacitor, and means for directing a charge on said capacitor through said relay coil.

4. A timing device for determining when a switch has been open for a predetermined length of time including a capacitor and a first resistor connected in series and forming a first circuit, an electronic switch, a second resistor and a relay coil being connected in series and forming a second circuit, said first circuit and said second circuit being connected in parallel, means for impressing a voltage across said first circuit and said second circuit, said switch being connected in parallel with said capacitor so that, when said switch is open, said capacitor will be charged, said electronic switch means being controlled by the charge on said capacitor.

5. A coupling control device for operating switch means in response to low intensity portions of a signal as claimed in claim 2 and further characterized by a switch contact means that is adapted to operate said controlled device during the momentary closure produced by the dissipation of said charge in said relay coil.

References Cited by the Examiner
UNITED STATES PATENTS

| | | | |
|---|---|---|---|
| 2,194,559 | 3/1940 | Koch | 240—148 X |
| 2,802,163 | 8/1957 | Lambert et al. | 318—460 |
| 2,980,826 | 4/1961 | Horton. | |
| 2,980,827 | 4/1961 | Hill. | |
| 3,112,430 | 11/1963 | Rossum et al. | |
| 3,137,838 | 6/1964 | Jeffers | 340—309.1 X |
| 3,144,568 | 8/1964 | Silliman et al. | 307—132 |
| 3,207,932 | 9/1965 | Tongret | 307—141 |
| 3,210,612 | 10/1965 | Lawrence | 317—147 X |
| 3,211,951 | 10/1965 | Skinner et al. | 307—141 X |

ORIS L. RADER, *Primary Examiner.*

W. M. SHOOP, T. B. JOIKE, *Assistant Examiners.*